United States Patent [19]

Armstrong

[11] Patent Number: 4,881,453
[45] Date of Patent: Nov. 21, 1989

[54] SERVO MECHANISM FOR ACTUATING A FRICTION BAND ASSEMBLY IN A PLANETARY GEAR SET

[75] Inventor: Douglas C. Armstrong, Novi, Mich.

[73] Assignee: General Motors Corporation, Detroit, Mich.

[21] Appl. No.: 211,614

[22] Filed: Jun. 27, 1988

[51] Int. Cl.⁴ .............................................. F16J 1/00
[52] U.S. Cl. .................................... 92/84; 92/130 R; 92/171.1; 74/868; 74/869; 74/753; 188/77 R
[58] Field of Search .................. 92/59, 84, 129, 146, 92/161, 130 R, 130 C, 130 D, 51, 52, 60, 171; 74/868, 869, 753; 188/77 R

[56] References Cited

U.S. PATENT DOCUMENTS

| | | | |
|---|---|---|---|
| 2,627,946 | 2/1953 | Misch | 188/77 R |
| 2,636,578 | 4/1953 | Swift | 188/77 R |
| 3,353,637 | 11/1967 | Chana | 92/62 |
| 3,386,535 | 6/1968 | Bishop et al. | 188/77 R |
| 3,450,005 | 6/1969 | Ellis | 92/52 |
| 3,593,598 | 7/1971 | Winn | 74/869 |
| 4,347,764 | 9/1982 | Lauven | 74/868 |
| 4,456,100 | 6/1984 | Manaki | 188/77 R |
| 4,601,233 | 7/1986 | Sugano | 92/52 |

FOREIGN PATENT DOCUMENTS

| | | | |
|---|---|---|---|
| 523280 | 3/1956 | Canada | 188/77 R |
| 1410937 | 4/1965 | France | 188/77 R |
| 866582 | 4/1961 | United Kingdom | 74/753 |
| 1077764 | 8/1967 | United Kingdom | 188/77 R |

Primary Examiner—Robert E. Garrett
Assistant Examiner—Thomas Denion
Attorney, Agent, or Firm—Donald F. Scherer

[57] ABSTRACT

A self contained servo mechanism (10, 110) for actuating a friction band assembly (13) in a planetary gear set. The servo mechanism (10, 110) is contained within a housing (25, 125) which incorporates a piston chamber (32, 132). The housing (25, 125) is demountably secured within a socket cavity (21, 121) provided in the transmission case (11, 111). A piston means (40, 140) is slidably received within the chamber (32, 132), and the piston means (40, 140) is operatively secured to an actuating pin (55, 155) that is slidably received within a pilot bore (34, 134) which penetrates the housing (25, 125) and which is aligned with the piston chamber (32, 132). The actuating pin is, in turn, operatively connected to a friction band assembly (13) within the transmission case (11, 111). A cover (41, 141) is secured to the transmission case (11, 111) not only to close the socket cavity (21, 121) and the interior cavity (12, 112) of the transmission case (11, 111) from the environment but also to close the piston chamber (32, 132) and to define a pressure portion (51, 151) of the chamber (32, 132) to act against the head (52, 152) of the piston (40, 140). Feed means (75, 175) are provided to effect hydraulic communication to the pressure portion (51, 151) of the piston chamber (32, 132).

2 Claims, 2 Drawing Sheets

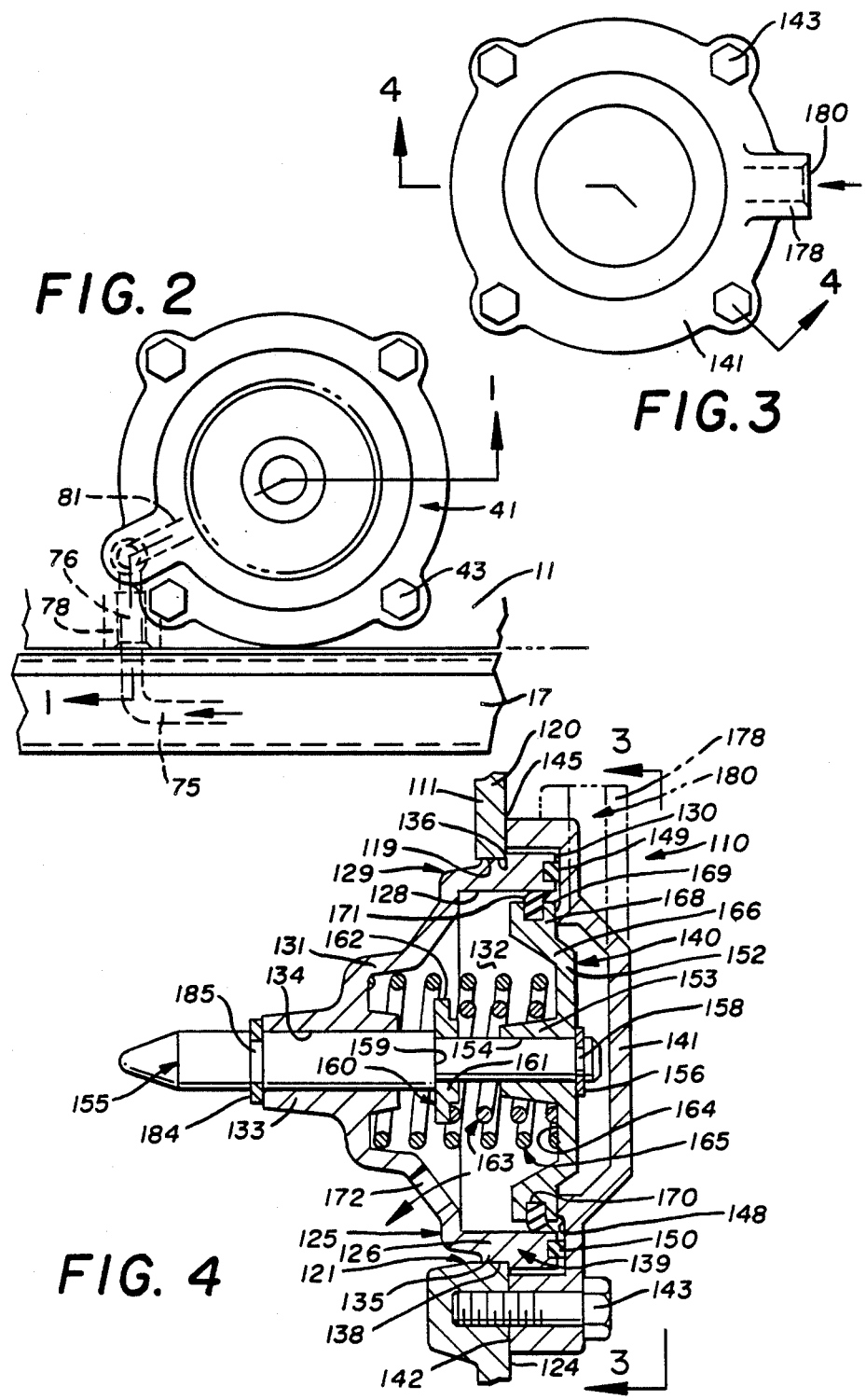

SERVO MECHANISM FOR ACTUATING A FRICTION BAND ASSEMBLY IN A PLANETARY GEAR SET

TECHNICAL FIELD

The present invention relates generally to planetary gear sets. More particularly, the present invention relates to servo mechanisms employed in conjunction with planetary gear sets. Specifically, the present invention relates to servo mechanisms of the type employed to actuate the one or more friction band assemblies of the type generally associated with planetary gear sets.

BACKGROUND OF THE INVENTION

The purpose of an automobile transmission is to provide a neutral, at least one reverse and one or more forward driving ranges that impart torque from the engine to the driving wheels, as required for the necessary driving force and the desired performance.

As is well known to the art, one widely accepted form of an automatic, vehicular transmission employs a compound planetary gear set that utilizes two braking bands to apply the friction required to obtain the desired function of the compound planetary gear set. The operator selects the driving range from the neutral, forward (either the standard drive, the "Intermediate" or the "Lo" forward selections) or reverse, and the transmission automatically changes gear ratios in relation to the vehicle speed and the engine torque input, as permitted within the range selected. Vehicle speed and engine torque signals are constantly fed to the transmission in a manner well known to the art in order to provide the proper gear ratio for maximum efficiency and performance at all throttle openings.

A planetary gear train consists of a center, or sun, gear, an internal gear and a planetary carrier assembly which includes and supports the smaller planet gears, or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear train rotate in the same direction and at the same speed, the third member is forced to turn at the same speed. For example, when the sun gear and the internal gear rotate in the same direction, and at the same speed, the planet gears do not rotate about their own axes but rather act as wedges to lock the entire unit together to effect what is known as direct drive.

Whenever the carrier assembly is restrained from spinning freely, and power is applied to either the sun gear or the internal gear, the planet gears act as idlers. In that way the driven member is rotated in the opposite direction as the drive member. Thus, when the reverse drive range is selected, a band assembly is actuated frictionally to engage the carrier assembly, and restrain it against rotation, so that torque applied to the sun gear will turn the internal gear in the opposite direction in order to reverse the rotational direction of the drive wheels, and thereby reverse the direction of the vehicle itself. The present invention relates to the servo mechanism employed to actuate the friction band assembly.

It should be appreciated that a second friction applying band assembly may also be employed when the engine compression, acting through the transmission, is being employed to effect a braking action. To understand this operation it is desirable to know that in a compound planetary gear set, multiple planetary gear sets may be employed, and adjacent planetary gear sets may utilize sun gears fabricated in one piece. Such adjacent planetary gear sets also generally connect the carrier of the first set to the internal gear of the second set. To make the two planetary gear sets effective a roller clutch assembly is generally employed to hold the carrier of the second set against rotation in at least one direction. A sprag assembly is also generally employed selectively to preclude the common sun gears from rotating in one selected direction.

When the gear selector is positioned in the Intermediate range to maintain the gear ratio in a range which will not exceed, for example, what would be considered a "second" gear, and the accelerator is released, the vehicle will decelerate using the engine compression as the braking force. In this situation the drive wheels are not being driven by the output shaft of the transmission but, conversely, the drive wheels are driving the transmission through the output shaft. With the power thus being applied to the output shaft by the drive wheels, there is a tendency for the sprag within the transmission to overrun, and thereby become ineffective. To preclude that result, and thereby to prevent the sun gear from over-running, a second friction band assembly may be employed to keep the transmission in "second" gear in order to assure effective, dynamic "braking" by virtue of the engine compression. A servo mechanism of the type embodying the concepts of the present invention may also be employed to actuate this second band assembly.

For even greater engine braking the transmission can be placed in the "Lo" range. At speeds below approximately 40 MPH the transmission will shift to first gear. When the vehicle is coasting in first gear the roller clutch tends to over-run, and in this situation the first described friction band assembly may be employed to restrain the conjoined carrier and internal gear of the adjacent sets from over-running the roller clutch assembly, and thus maintain the transmission in first gear in order to assure effective, dynamic braking by virtue of the engine compression.

The servo mechanism employed to operate each band assembly generally incorporates a hydraulically actuated piston assembly. Historically, the configuration of the transmission case within which the planetary gear set is housed was further complicated because it included a boss which had to be accurately machined in order to provide the necessary piston chamber within which an actuating piston assembly could reciprocate to effect operation of an associated friction band assembly.

Transmission cases have historically been, and continue to be, metallic castings. Castings do, on occasion, incorporate voids, but even microscopic voids, which are likely to be considered as determining the porosity of the casting, can be adversely located, and can be of such localized abundance, that when the casting is machined one or more of the machined surfaces will prove to be unacceptable for the intended purpose of those surfaces. As should be readily apparent, the structural properties of strength and hardness required to make an acceptable transmission case are not necessarily conducive to providing a readily machinable casting. In fact, variations in the section thickness of a casting, and particularly a casting having the complexity of a transmission case, can cause localized hard, or soft, spots. Although one might ideally desire a more homogenous casting, such localized variations in the physical properties of the casting may not themselves negate the suitability thereof to serve as a transmission case. Unfortunately, however, such localized variations can adversely affect the ability of the casting to be acceptably machined.

For example, the reaction of a machine tool against a localized hard spot can cause microscopic, if not macroscopic, grooves which could well preclude the effective sealing of the pressure chamber required for the piston assembly in a servo mechanism built into the transmission case, and such flaws might not be identified until after at least partial assembly of the transmission. But even if any such flaw were detected at the earliest possible opportunity, the result would be a rejected transmission case.

In today's highly automated production facilities the rejection of components, and particularly major components, can not only severely increase the cycle time required to deliver that component to the assembly line but can also significantly increase the cost of that particular component.

SUMMARY OF THE INVENTION

It is, therefore, a primary object of the present invention to provide an improved servo mechanism that will permit a significant reduction in the complexity of the transmission case with which the servo mechanism is to be employed.

It is a another object of the present invention to provide an improved servo mechanism, as above, which will permit a reduction in the machining operations required to prepare a transmission case for having the improved servo mechanism operatively secured thereto and thereby reduce the scrap rate for cast transmission cases and concomitantly reduce the cycle time for the production of such transmission cases.

It is still another object of the present invention to provide an improved servo mechanism, as above, which is self contained.

It is a further object of the present invention to provide an improved servo mechanism, as above, which can be demountably secured to a transmission case as a self contained unit—i.e., when the servo mechanism is operating, all hydraulic actuating pressures are confined within the housing of the servo mechanism itself.

It is a still further object of the present invention to provide an improved servo mechanism, as above, the principal components of which can be assembled into a sub-assembly that can be secured to a transmission case as a unit for operative connection to a friction band assembly in a planetary gear set contained within the case.

These and other objects of the invention, as well as the advantages thereof over existing and prior art forms, which will be apparent in view of the following detailed specification, are accomplished by means hereinafter described and claimed.

In general, a servo mechanism embodying the concepts of the present invention is self contained and may be demountably secured within an internal socket cavity provided in the transmission case. An access aperture provides communication between the socket cavity and the interior of the transmission case, and a closure face circumscribes the socket cavity.

The servo mechanism has a housing, and the exterior of the housing presents a plurality of circumferentially spaced locating pilot means that cooperate with the socket cavity to orient the housing therein. The interior of the housing contains a piston chamber within which a piston is slidably received. An actuating pin is secured to the piston, and the actuating pin is slidably received within a pilot bore that extends longitudinally outwardly from the piston chamber interiorly of a pin pilot presented from the housing of the servo mechanism to guide the actuating pin as it operates within the interior cavity of the transmission case. The actuating pin is also operatively secured to a friction band assembly associated with the planetary gear set received within the interior cavity of the transmission case such that translation of the piston within the piston chamber actuates the friction band assembly.

A cover is secured to the transmission case to coact with the closure face and thereby seal the socket cavity, and the interior of the transmission case, from atmosphere. The cover also coacts with the housing to close one end of the piston chamber and thereby define a pressure chamber to which the head of the piston is exposed.

One exemplary servo mechanism, and a modification thereof, both embodying the concepts of the present invention are shown by way of example in the accompanying drawings and are described in detail without attempting to show all of the various forms and modifications in which the invention might be embodied; the invention being measured by the appended claims and not by the details of the specification.

BRIEF DESCRIPTION OF THE DRAWINGS

FIG. 2 is a reduced, end elevation of the servo mechanism, taken substantially along line 2—2 of FIG. 1;

FIG. 3 is an end elevation, similar to FIG. 2, but depicting an alternative embodiment of a servo mechanism embodying the concepts of the present invention; and, FIG. 4 is an enlarged cross sectional view taken substantially along line 4—4 of FIG. 3.

DESCRIPTION OF AN EXEMPLARY EMBODIMENT

Figure 1:
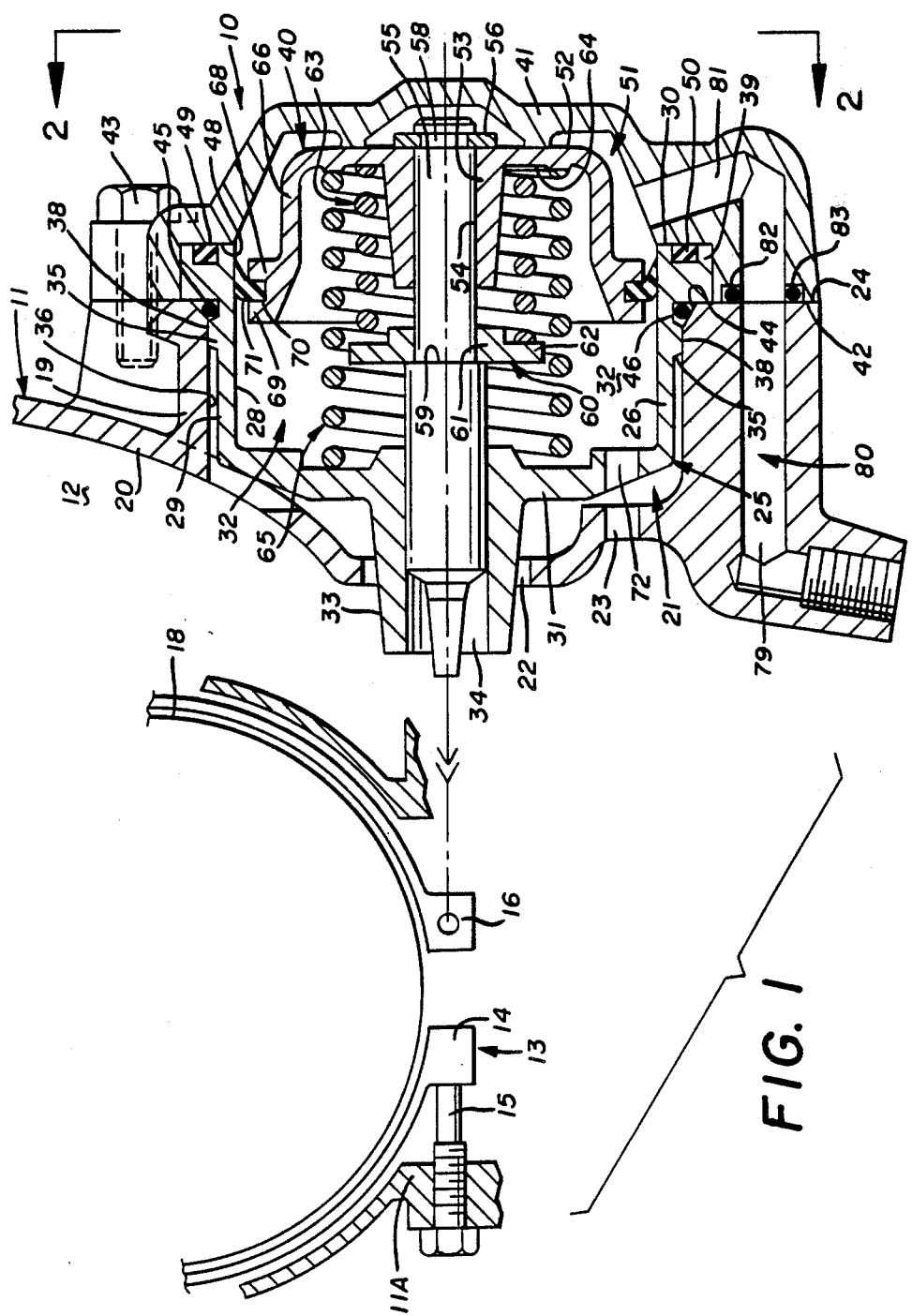
FIG. 1 is a cross sectional view of a servo mechanism embodying the concepts of the present invention taken substantially along line 1—1 of FIG. 2 to represent the servo mechanism demountably secured to a transmission case and with the servo mechanism schematically depicted as being operatively connected to a friction band assembly of the type typically employed in a planetary gear set;.

One representative form of a servo mechanism embodying the concepts of the present invention is designated generally by the numeral 10 on FIGS. 1 and 2 of the accompanying drawings. The representative servo mechanism 10 is, as will be hereinafter more fully explained, operatively secured to a vehicular transmission case 11 which has an interior cavity 12 for receiving a planetary gear set. Inasmuch as planetary gear sets are well known to the art only that element of the planetary gear set to which the servo mechanism 10 is operatively engaged is depicted in the drawings. Specifically, a friction band assembly 13 is depicted with one end portion 14 thereof being adjustably secured, as by the set screw 15, to a relevant portion 11A of the transmission case 11 and with the other end portion 16 thereof being operatively connected to the servo mechanism 10 in a manner generally hereinafter more fully explained, selectively to preclude rotation of a desired member 18 in the planetary gear set. Typically, the servo mechanism 10 could selectively actuate the band assembly 13 frictionally to engage a carrier for the pinions of a planetary gear set. Member 18 could thus be schematically representative of a carrier assembly in a planetary gear set. To provide a modicum of environmental orientation FIG. 2 depicts a pan 17 disposed beneath the transmission case 11.

In the embodiment depicted in FIGS. 1 and 2, a receptacle 19 extends outwardly from the wall 20 of the transmission case 11, and the interior of the receptacle 19 defines a socket cavity 21 within which the servo mechanism 10 may be demountably secured. An access aperture 22 penetrates the wall 20 of the transmission case 11 to permit communication between the interior cavity 12 of the transmission case 11 and the socket cavity 21 provided interiorly of the receptacle 19. A drain opening 23 also penetrates the wall 20 to permit any fluid within the socket cavity 21 freely to drain into the interior cavity 12 of the transmission case 11. The receptacle 19, which extends outwardly from the wall 20, terminates in a closure face 24. The closure face 24 is oriented transversely of the receptacle 19 and circumscribes the socket cavity 21.

The servo mechanism 10 employs a housing 25 which is adapted to be received within the socket cavity 21. The housing 25 may be configured with a substantially annular skirt portion 26 having a preferably cylindrical interior surface 28 and a substantially cylindrical exterior surface 29. The interior surface 28 extends between a sealing face 30 at one end of the skirt portion 26, and a transverse wall 31 which extends across, and substantially closes, the second end of the skirt portion 26. As such, the interior surface 28 constitutes the cylindrical wall of a piston chamber 32 which opens outwardly through that end of the skirt portion 26 defined by the sealing face 30.

A pin pilot 33 extends outwardly from the transverse wall 31 in a direction away from the piston chamber 32, and a pilot bore 34 extends through the pin pilot 33. The pilot bore 34 is axially aligned with the piston chamber 32 and communicates between the piston chamber 32 and the exterior of the housing 25. When the servo mechanism 10 is received within the socket cavity 21 the pilot bore 34 communicates with the interior cavity 12 of the transmission case 11.

A plurality of axially extending locating ribs 35 are preferably presented at circumferentially spaced locations about the exterior surface 29 of the skirt portion 26. The radial extent of the several locating ribs 35 is such that they will collectively engage the interior surface 36 of the socket cavity 21 to effect the desired radial orientation of the housing 25 within the socket cavity 21 such that the pin pilot will effectively align with the end portion 18 of the friction band assembly 13. As such, the interior surface 36 of the socket cavity 21 need, at most, only be machined to the degree necessary properly to engage the locating ribs 35 of the housing 25. Similarly, the radially outermost surface 38 on each locating rib 35 need be finished only to the degree necessary for the locating ribs 35 cooperatively to engage the interior surface 36 of the socket cavity 21 and effect the aforesaid alignment of the pin pilot 33 with the end portion 18 of the band assembly 13.

The sealing face 30 is presented from a radially enlarged rim 39 at one end of the skirt portion 26, and the rim 39 engages the closure face 24 to serve as a stop which determines the extent to which the housing 25 may be inserted within the socket cavity 21. As such, the locating ribs 35 and the rim 39 combine to serve as the locating pilot means which determines the position of the housing 25 relative to the socket cavity 21 when the servo mechanism 10 is demountably secured to the transmission case 11.

It should now be apparent that the unblemished machine finish heretofore required on various surfaces of the transmission case to accommodate prior art servo mechanisms has been eliminated. Effective operation of a servo mechanism 10 embodying the concepts of the present invention requires only that an unblemished machine finish be provided on the relatively small surface presented by the hereinafter described chamfer 44. This result obtains in view of the fact that the actuating piston 40 is not received for reciprocation directly within the socket cavity 21, but is, instead, received within the chamber 32, as will hereinafter be more fully described.

A cover 41 may be demountably secured to the receptacle 19. As depicted, the cover 41 has a transversely oriented closure surface 42 that is disposed in opposition to the transversely oriented closure face 24 at the outermost end of the receptacle 19. A plurality of mounting bolts 43 may be employed to secure the cover 41 to the receptacle 19, and in order for the cover 41 effectively to seal the socket cavity 21—and the interior cavity 12 of the transmission case 11—from atmosphere, the radially innermost edge of the closure face 24 may be chamfered, as at 44, to be engaged by a seal, such as the O-ring 45, received within the notch 46 which circumscribes the skirt portion 26 of the housing 25 at the appropriate axial location along the skirt portion 26. The O-ring 45 cooperatively engages the chamfer 44 when the mounting bolts 43 are tightened.

When the bolts 43 are tightened, an annular sealing surface 48 on the cover 41 is driven against the sealing face 30 at one end of the skirt portion 26. Driving the sealing surface 48 against the sealing face 30, in turn, axially forces the housing 25 inwardly relative to the socket cavity 21 to compress the O-ring 45 into sealing engagement against the chamfer 44. As such, that seal is effected irrespective of whether the closure surface 42 on the cover 41 fully engages the closure face 24 on the receptacle 19. Thus, only the chamfer 44 on the transmission case 11 need be provided with an unblemished machine finish to assure effective operation of the improved servo mechanism 10.

The axially directed sealing face 30 on the skirt portion 26 may be recessed, as at 49, to receive a sealing means such as the square compression ring 50 which will compress as the sealing surface 48 on the cover 41 is forced against the sealing face 30 on the skirt portion 26 in response to tightening of the mounting bolts 43. The compression ring 50 thus effects a desired hydraulic seal between the cover 41 and the housing 25 to close the piston chamber 32 and delineate the pressure portion 51 of the chamber 32, the pressure portion 51 being interposed between the cover 41 and the head 52 of the actuating piston 40.

The actuating piston 40 has a central hub portion 53 which extends axially away from the head 52. The interior of the hub portion 53 has an axially oriented bore 54 which opens through the head 52 and within which an actuating pin 55 is slidable received. A retaining ring 56 is received within an annular slot 58 that is recessed into that end portion of the actuating pin 55 which extends through the head 52 of the piston 40. With the retaining ring 56 received within the annular slot 58 engagement of the ring 56 with the head 52 of piston 40 determines one limit to the range of relative motion permitted between the piston 40 of actuating pin 55.

The actuating pin 55 is also slidably received within the pilot bore 34 which extends axially through the pin pilot 33, but the diameter of that portion of the actuating pin 55 which is received within the pilot bore 34 is preferably larger than the diameter of that portion which extends through the bore 54 in the hub portion 53. A shoulder 59 delineates the transition between the two diameters, and an annular reaction ring 60 rests against the shoulder 59.

The reaction ring 60 has a hub portion 61 which is engaged by the hub portion 53 on the actuating piston 40 to determine the other limit to the range of relative motion permitted between the piston 40 and the actuating pin 55. As such, when the piston 40 moves to the left (as viewed in FIG. 1) the hub portion 53 of the piston 40 engages the hub portion 61 on the reaction ring 60 and drives it against the shoulder 59 which, in turn, precludes further relative movement between the actuating pin 55 and the piston 40 and effects axial translation of the actuating pin 55 in response to continued movement of the piston 40. The reaction ring 60 also has a flange 62 which extends radially outwardly from the hub portion 61. A first compression spring 63 acts between the flange 62 on the reaction ring 60 and the under surface 64 of the piston head 52. A second compression spring 65 acts between the under surface 64 of the piston head 52 and the transverse wall 31. Hence, initial movement of the piston 40 to the left as depicted in FIG. 1 requires the application of a force to the head 52 of piston 40 sufficient to overcome the resistive action of both springs 63 and 65.

Once the reaction ring 60 is engaged by the hub portion 53 of the piston 40 further compression of spring 63 is precluded, as is further relative movement between the piston 40 and the actuating pin 55. Continued, joint movement of the piston 40 and the actuating pin 55 may be effected merely by overcoming the resistive action of spring 65.

The force employed to effect the aforesaid movement of the piston 40 constitutes the hydraulic pressure applied against the head portion 52 of piston 40 from the pressure portion 51 of piston chamber 32. Hence, the use of the dual springs 63 and 65 in staged joint, and single, operation permits smooth initial engagement of the friction band assembly 13 with the selected element 18 of the planetary gear set and thereafter assures firm locking engagement. The release of the friction band assembly 13 is also more smoothly effected by use of the dual, staged spring members 63 and 65, as is well know to the art.

A skirt portion 66 circumscribes the head 52 on the piston 40 and one longitudinal end of the skirt portion 66 merges with the circumferential edge of the head 52. The other longitudinal edge of the skirt portion 66 terminates in a bulbous rib 68, the radially outer surface 69 of which presents an annular, seal receiving recess 70 within which an annular wiping seal 71 is received. The wiping seal 71 is thus interposed between the rib 68 and the cylindrical interior surface 28 within the skirt portion 26 of the housing 25 to maintain the integrity of the pressure portion 51 of the chamber 32 as the piston 40 reciprocates therein.

That portion of the piston chamber 32 other than that employed as the pressure portion 51 may communicate with the interior of the socket cavity 21 by virtue of a drain aperture 72 which penetrates the transverse wall 31 and which may, as depicted in FIG. 1, be generally aligned with the drain opening 23 in wall 20 to communicate with the interior cavity 12 of the transmission case 11.

A feed line, identified generally by the numeral 75 in FIG. 2, communicates between a source of pressurized hydraulic fluid and the pressure portion 51 of piston chamber 32. A suitable male coupler 76 on the feed line 75 may be secured within the threaded female coupling arrangement 78 recessed into the transmission case 11. A first branch 79 of a passageway 80 communicates with the feed line 75 through the coupler arrangement 78 and extends axially along the receptacle 19 to open through the closure face 24.

The second branch 81 of the passageway 80 is provided within the cover 41. One end of the second branch 81 is aligned with the first branch 79 when the cover 41 is positioned on the receptacle 19, and the other end of the second branch 81 opens into the pressure portion 51 of the chamber 32. That end of the second branch 81 which aligns with the first branch 79 may be counterbored, as at 82, to receive a sealing means, such as the O-ring 83 depicted.

Turning now to the alternative embodiment of the servo mechanism depicted in FIGS. 3 and 4 and identified generally by the numeral 110, it too includes a self contained sub assembly that can be demountably secured to a vehicular transmission case 111. The servo mechanism 110, however, is depicted as being demountably secured to a socket cavity 121 which is configured as the interior of a bore 119, through the wall 120 of the transmission case 111 whereby the servo mechanism 110 gains access to the interior cavity 112 of the transmission case 111.

The servo mechanism 110 has a housing 125 which is adapted to be received within the socket cavity 121. The housing 125 has a substantially annular skirt portion 126 with a preferably cylindrical interior surface 128 and an exterior surface configuration 129. The interior surface 128 extends between a sealing face 130 at one end of the skirt portion 126 and a stepped, or otherwise generally conically tapered, wall 131 which closes the second end of the skirt portion 126. The interior surface 128 constitutes the cylindrical wall of a piston chamber 132 which opens outwardly through that end of the skirt portion 126 defined by the sealing face 130.

A pin pilot 133 extends outwardly from the apex of the stepped wall 131 in a direction away from the piston chamber 132, and a pilot bore 134 extends through the pin pilot 133 slidably to receive the hereinafter describe actuating pin 155.

A plurality of axially extending locating ribs 135 may be presented at circumferentially spaced locations about the housing 125 and thus be included in the exterior surface configuration 129 of the skirt portion 126. The radial extent of the several locating ribs 135 is such that they will collectively engage the interior surface 136 of the bore 119 forming the socket cavity 121 to effect the desired radial orientation of the housing 25 within the socket cavity 121 such that the pin pilot 133 will effectively align with the appropriate end portion of a friction band assembly (not shown). As such, the interior surface 136 of the socket cavity 121 need, at most, only be machined to the degree necessary properly to engage the locating ribs 135 on the housing 125. Similarly, the radially outermost surface 138 on each locating rib 135 need be finished only to the degree necessary for the locating ribs 135 cooperatively to engage the interior surface 136 of the socket cavity 121 and effect the desired alignment of the pin pilot 133 with the appropriate end portion of a friction band assembly.

The sealing surface 130 is presented from a radially enlarged rim 139 at one end of the skirt portion 126, and the rim 139 engages the closure face 124 to serve as a stop which determines the extent to which the housing 125 may be inserted within the socket cavity 121. As such, the locating ribs 135 and the rim 139 combine to serve as the locating pilot means which controls the disposition of the housing 125 when the servo mechanism 110 is demountably secured to a transmission case 111.

As was apparent from the description of the first embodiment of the servo mechanism 10 described herein, it should now also be apparent that the unblemished machine finish heretofore required on various surfaces of transmission cases fabricated to accommodate prior art servo mechanisms has been eliminated. Effective operation of a servo mechanism 110 embodying the concepts of the present invention requires only that a relatively unblemished machine finish be provided on the closure face 124 which circumscribes the socket cavity 121. This result primarily obtains in view of the fact that the actuating piston 140 is not received for reciprocation directly within the socket cavity 121, but is, instead, received within the chamber 132, as will hereinafter be more fully described.

A cover 141 may be demountably secured to the transmission case 111. As depicted, the cover 141 has a transversely oriented closure surface 142 that is disposed in opposition to the closure face 124. A plurality of mounting bolts 143 may be employed to secure the cover 141 to the transmission case 111, and in order for the cover 141 effectively to seal the socket cavity 121—and the interior cavity 112 of the transmission case 111—from atmosphere, one need merely interpose a standard gasket arrangement 145 between the closure face 124 and the closure surface 142.

A plurality of mounting bolts 143 may be employed to secure the cover 141 to the transmission case 111, and thereby appropriately compress the gasket arrangement 145. Such an arrangement works quite satisfactorily when the servo mechanism 110 is located above the fluid level within the interior cavity 112 of the transmission case 111 so that the servo mechanism 110 is exposed only to whatever fluid may splash thereagainst. The risk a fluid loss between the closure face 124 and the closure surface 142 is further minimized in view of the fact that the fluid within the case 111 is maintained at a low pressure level.

When the bolts 143 are tightened, an annular sealing surface 148 on the cover 141 is driven against the sealing face 130 at one end of the skirt portion 126. The axially directed sealing face 130 on the skirt portion 126 may be recessed, as at 149, to receive a sealing means such as the square compression ring 150 which will compress as the sealing surface 148 on the cover 141 is forced against the sealing face 130 on the skirt portion 126 in response to tightening of the mounting bolts 143.

The compression ring 150 thus effects a desired hydraulic seal between the cover 141 and the housing 125 to close the piston chamber 132 and delineate the pressure portion 151 which is interposed between the cover 141 and the head 152 of the actuating piston 140.

The actuating piston 140 has a central hub portion 153 which extends axially away from the head 152. The interior of the hub portion 153 has an axially oriented bore 154 which opens through the head 152 and within which the actuating pin 155 is slidable received. A retaining ring 156 is received within an annular slot 158 that is recessed into that end portion of the actuating pin 155 which extends through the head 152 of the piston 140. With the retaining ring 156 received within the annular slot 158 engagement of the ring 156 with the head 152 of piston 140 determines one limit to the range of relative motion permitted between the piston 140 of actuating pin 155.

The actuating pin 155 is also slidably received within the pilot bore 134 which extends axially through the pin pilot 133, but the diameter of that portion of the actuating pin 155 which is received within the pilot bore 134 is preferably larger than the diameter of that portion which extends through the bore 154 in the hub portion 153. A shoulder 159 delineates the transition between the two diameters, and an annular reaction ring 160 rests against the shoulder 159.

The reaction ring 160 has a hub portion 161 which is engaged by the hub portion 153 on the actuating piston 140 to determine the other limit to the range of relative motion permitted between the piston 140 and the actuating pin 155. As such, when the piston 140 moves to the left (as viewed in FIG. 4) the hub portion 153 of the piston 140 engages the hub portion 161 on the reaction ring 160 and drives it against the shoulder 159 which, in turn, precludes further relative movement between the actuating pin 155 and the piston 140 and effects axial translation of the actuating pin 155 in response to continued movement of the piston 140. The reaction ring 160 also has a flange 162 which extends radially outwardly from the hub portion 161. A first compression spring 163 acts between the flange 162 on the reaction ring 160 and the under surface 164 of the piston head 152. A second compression spring 165 acts between the under surface 164 of the piston head 152 and the stepped wall 131. Hence, initial movement of the piston 140 to the left as depicted in FIG. 4 requires the application of a force to the head 152 of piston 140 sufficient to overcome the resistive action of both springs 163 and 165.

Once the reaction ring 160 is engaged by the hub portion 153 of the piston 140 further compression of spring 163 is precluded, as is further relative movement between the piston 140 and the actuating pin 155. Continued, joint movement of the piston 140 and the actuating pin 155 may be effected merely by overcoming the resistive action of spring 165.

The force employed to effect the aforesaid movement of the piston 140 constitutes the hydraulic pressure applied against the head portion 152 of piston 140 from the pressure portion 151 of piston chamber 132.

An annular skirt portion 166 circumscribes, and merges with, the head 152 on the piston 140. The radially outer edge of the skirt portion 166 presents a bulbous rim 168, and an annular seal receiving recess 170 is recessed into the radially outer surface 169 of the rim 168. An annular wiping seal 171 is received in the recess 170. The wiping seal 171 is thus interposed between the rim 168 and the cylindrical interior surface 128 within the skirt portion 126 of the housing 125 to maintain the integrity of the pressure portion 151 of the chamber 132 as the piston 140 reciprocates therein. That portion of the piston chamber 132 other than that employed as the pressure portion 151 may communicate with the interior cavity 112 of the transmission case 111 by virtue of a drain aperture 172 which penetrates the stepped wall 131.

A feed line (not shown) communicates between a source of pressurized hydraulic fluid and the pressure portion 151 of piston chamber 132. A suitable male coupler, also not shown, on the feed line may be secured to the threaded female coupling arrangement 178 recessed into the cover 141. A passageway 180 communicates with the feed line through the coupler arrangement 178 and opens into the pressure portion 151 of the chamber 132.

To facilitate assembly of the servo mechanism 110, and also to maintain the components thereof together without the cover 141 being secured against the housing 125 to close the chamber 132, a retaining ring 184 may be received within an annular recess 185 in the actuating pin 155. The engagement of the retaining ring 184 with the pin pilot 133 will maintain the actuating pin 155, and the piston 140 connected thereto, within the housing 125, even against the biasing action of the springs 163 and 165.

As should now be apparent, the present invention not only teaches that a servo mechanism can be fabricated as a self contained sub assembly which can be demountably secured to a transmission case in such a way as to significantly reduce the complexity in the manufacture and preparation of a transmission case to receive a servo mechanism but also that the other objects of the invention can likewise be accomplished.

The embodiments of the invention in which an exclusive property or privilege is claimed are defined as follows:

1. A self contained servo for selectively actuating a friction band assembly in a planetary gear set in combination with a transmission case having an interior cavity for receiving a planetary gear set, said servo and transmission case combination comprising: a socket cavity presented from said transmission case; said socket cavity communicating with the interior cavity of said transmission case; a closure face presented from said transmission case and circumscribing said socket cavity; said servo having a housing; locating pilot means presented from the exterior of said housing; said locating pilot means engaging said socket cavity; a piston chamber provided interiorly of said housing; a pilot bore penetrating said housing and being aligned with said piston chamber; an actuating pin slidably received within said pilot bore; piston means slidably received within said piston chamber and operatively secured to said actuating pin; a cover secured to said closure face and operatively engaging said housing to close said piston chamber and to define a pressure chamber against said piston means; and, feed means provided through said cover to effect hydraulic communication with said pressure chamber.

2. A servo sub-assembly comprising: a housing; said housing having a substantially annular skirt portion with opposite ends, a substantially cylindrical interior surface and a substantially cylindrical exterior surface; locating pilot means presented from the exterior surface of said skirt portion; a piston chamber bounded by the interior surface of said skirt portion; the first end of said skirt portion opening into said piston chamber; a wall extending across, and closing, the second end of said skirt portion; a pin pilot extending outwardly from said wall in a direction away from said piston chamber; a pilot bore extending through said pin pilot; said pilot bore aligned relative to, and communicating with, said piston chamber; piston means slidably received within said piston chamber; an actuating pin slidably received within said pilot bore; said actuating pin having opposed ends, one end of said actuating pin being operatively connected to said piston means; and, the opposite end of said actuating pin extending outwardly through said pilot bore.

* * * * *